US012542052B2

(12) United States Patent
Karapantelakis et al.

(10) Patent No.: US 12,542,052 B2
(45) Date of Patent: Feb. 3, 2026

(54) METHOD AND APPARATUS FOR GENERATING AN ACCIDENT INFORMATION GRAPH

(71) Applicant: Telefonaktiebolaget LM Ericsson (publ), Stockholm (SE)

(72) Inventors: Athanasios Karapantelakis, Solna (SE); Maxim Teslenko, Sollentuna (SE); Marios Daoutis, Bromma (SE); Elena Fersman, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 18/027,658

(22) PCT Filed: Sep. 29, 2020

(86) PCT No.: PCT/EP2020/077255
§ 371 (c)(1),
(2) Date: Mar. 22, 2023

(87) PCT Pub. No.: WO2022/069025
PCT Pub. Date: Apr. 7, 2022

(65) Prior Publication Data
US 2023/0377455 A1 Nov. 23, 2023

(51) Int. Cl.
*G08G 1/01* (2006.01)
*G08B 25/00* (2006.01)
(52) U.S. Cl.
CPC ......... *G08G 1/0112* (2013.01); *G08B 25/006* (2013.01); *G08G 1/0133* (2013.01)

(58) Field of Classification Search
CPC ... G08G 1/0112; G08G 1/0133; G08B 25/006
See application file for complete search history.

(56) References Cited

U.S. PATENT DOCUMENTS 8,160,764 B2 4/2012 Choi et al.
9,852,636 B2 12/2017 Chow et al.
(Continued)

FOREIGN PATENT DOCUMENTS

EP 3681132 A1 7/2020

OTHER PUBLICATIONS

"Ford Technology—Driver Assistance Systems", https://www.ford.co.uk/shop/research/technology/driving-experience/ford-sync-with-emergencyassistance, 12 pages.
(Continued)

*Primary Examiner* — Hussein Elchanti
(74) *Attorney, Agent, or Firm* — Murphy, Bilak & Homiller, PLLC

(57) ABSTRACT

A coordination node (1000) is disclosed for coordinating generation of an accident information graph comprising information representative of a vehicle accident environment. The coordination node comprises processing circuitry (1010) configured to detect an event associated with occurrence of a vehicle accident (110) and obtain environment data representative of the vehicle accident environment in which the event was detected (120). The processing circuitry is further configured to generate an accident information graph based on the obtained environment data, wherein the accident information graph comprises a structured representation of the obtained environment data and at least one semantic annotation to the obtained environment data (130).

12 Claims, 13 Drawing Sheets

(56) References Cited

U.S. PATENT DOCUMENTS

| | | | |
|---|---|---|---|
| 10,559,202 B2* | 2/2020 | Yang | G06F 21/604 |
| 11,417,128 B2* | 8/2022 | Law | G06V 20/52 |
| 11,620,862 B1* | 4/2023 | Serrao | G06T 13/80 |
| | | | 345/419 |
| 2009/0105902 A1 | 4/2009 | Choi et al. | |
| 2013/0311641 A1 | 11/2013 | Chow et al. | |
| 2015/0112504 A1* | 4/2015 | Binion | G07C 5/008 |
| | | | 701/1 |
| 2015/0127570 A1* | 5/2015 | Doughty | G06Q 50/265 |
| | | | 705/325 |
| 2016/0189310 A1* | 6/2016 | O'Kane | G06Q 40/08 |
| | | | 705/4 |
| 2018/0122237 A1* | 5/2018 | Nascimento | G08G 1/096758 |
| 2019/0034716 A1 | 1/2019 | Kamarol et al. | |
| 2019/0197369 A1 | 6/2019 | Law et al. | |
| 2020/0226921 A1 | 7/2020 | Higuchi et al. | |

OTHER PUBLICATIONS

"Intelligent transport systems—Cooperative systems—Data exchange specification for in-vehicle presentation of external road and traffic related data", CEN/TC 278—Intelligent Transport Systems, Technical Work, Reference CEN ISO/TS 17425:2016, Work Item No. 00278287, Jun. 22, 2016, 3 pages.

"Intelligent transport systems—Framework for cooperative telematics applications for regulated commercial freight vehicles (TARV)—Part 10: Emergency messaging system/eCall", ISO/TC 204, Intelligent transport systems, 15722:2015, ISO 15638-series, 8 pages.

"Intelligent Transport Systems (ITS); ITS-G5 Access layer specification for Intelligent Transport Systems operating in the 5 GHz frequency band", Final draft ETSI EN 302 663 V1.3.1, Oct. 2019, 25 pages.

"Welcome To OnStar; Safety When & Where You Need It", OnStar, 2 pages.

Grivanova, O V, et al., "GLONASS technologies as innovative development ofroad transport: social and economic impact", IOP Conference Series: Materials Science and Engineering, vol. 632, International Conference on Innovations in Automotive and Aerospace Engineering, Irkutsk National Research Technical University, Irkutsk, Russia, May 27-Jun. 1, 2019, 3 pages.

Klotz, Benjamin , et al., "VSSo: a Vehicle Signal and Attribute Ontology for the Web of Things", 9th International Semantic Sensor Networks WorkshopAt: Monterey, CA, USA, Oct. 2018, 20 pages.

Shayeji, Mohammad H. Al, "Analysis and Enhancements of Leader Elections algorithms in Mobile Ad Hoc Networks", XP055695965, https://arxiv.org/ftp/arxiv/papers/1210/1210.1686.pdf, Oct. 5, 2012, 5 pages.

* cited by examiner

METHOD AND APPARATUS FOR GENERATING AN ACCIDENT INFORMATION GRAPH

TECHNICAL FIELD

The present disclosure relates to a coordination node and a method for generating an accident information graph comprising information representative of a vehicle accident environment. The present disclosure further relates to an emergency authority and a method for initiating an action based on an accident information graph.

Background

The increasing number of connected devices using Internet of Things (IoT) and similar communication protocols such as Constrained Application Protocol (CoAP) has allowed for many previously unconnected entities to benefit from improved communication capabilities. One area where this technology has flourished is the automotive sector, where vehicle-to-vehicle communication has the potential to provide many benefits.

In particular, the increased connectivity of vehicles has been used to improve the speed and efficiency with which emergency authorities are notified in the event of a vehicle accident or collision. Several emergency call notification systems have been developed in a number of jurisdictions. Since April 2018, the European Union, has made it mandatory for all newly developed vehicles to have the capability to use an "eCall system" for vehicles to automatically notify local emergency services in the event of a vehicle accident. In the United States, General Motors have developed an "OnStar system", which provides a similar notification to emergency authorities in the case of a vehicle accident. Ford have also developed the "SYNC Emergency Assistance system", which can provide a similar notification to emergency services. In Russia, the "ERA/GLONASS" system has been developed for automatic vehicle notification of an accident.

As well as single vehicle reporting of an accident, systems have also been developed that allow for collaborative vehicle reporting of vehicle accidents or collisions. U.S. patent application Ser. No. 13/474,818 discloses such a system where a traffic event identification and data collection system provides information discovery, acquisition and exchange, from primary and secondary monitoring components of a traffic event such as an accident. Such monitoring components can include sensor devices associated with vehicles. The data of the traffic event is augmented, consolidated and stored in a centralized data store, which includes traffic events (such as accidents) which are identified, retrieved and stored according to the date, time and location of the associated traffic event e.g. accident.

U.S. patent application Ser. No. 12/125,992 discloses a similar system that uses a vehicle device installed in a vehicle, which collects vehicle travel information from on-board sensors of the vehicle and stores the vehicle travel information in a vehicle black box. The vehicle device also collects information from other nearby vehicles through communication with the other vehicles. When an accident occurs, the vehicle also employs an accident information generating device, which generates accident occurrence information during an accident and transmits the accident occurrence information to a related agency. The collected information is identified by time, location, and type of accident.

The vehicle accident reporting systems described above provide direct or indirect transmission of data associated with a vehicle accident to an emergency service or authority. The data associated with the accident may be used by the emergency service or authority for identifying the severity and type of accident. For example, the data associated with the accident may include location data, airbag sensor readings, impact sensors readings, brake sensor readings, temperature sensor readings etc.

There are, however, a number of problems that exist with the above described vehicle accident reporting systems.

The accuracy of the collection and transmission of the data associated with a vehicle accident is limited by the condition of the vehicles involved and the surrounding connected vehicles. In some accidents, the vehicles involved may be damaged to an extent where they cannot respond to accident information collection requests in a reasonable timeframe, or may not be able to transmit complete data samples. In addition, significant data analysis may be required at the authority receiving the information in order to obtain usable intelligence.

The systems described above also may not be able to capture all information associated with a vehicle accident. The systems rely on connected vehicles or connected roadside infrastructure units gathering information associated with themselves and transmitting this directly or indirectly to an authority. However, one or more other entities may be involved in the accident, which do not have the capability to communicate information about themselves or the environment to the authority e.g. legacy vehicles lacking connectivity, pedestrians, bicycles etc.

SUMMARY

It is an aim of the present disclosure to provide a coordination node, emergency authority, methods and a computer readable medium which at least mitigate one or more of the problems described above.

According to an aspect of the present disclosure there is provided a coordination node for coordinating generation of an accident information graph that comprises information representative of a vehicle accident environment. The coordination node comprises processing circuitry configured to: detect an event associated with occurrence of a vehicle accident, obtain environment data representative of the vehicle accident environment in which the event was detected and generate an accident information graph based on the obtained environment data, wherein the accident information graph comprises a structured representation of the obtained environment data and at least one semantic annotation to the obtained environment data.

According to another aspect of the present disclosure there is provided a method, performed by a coordination node, for generating an accident information graph that comprises information representative of a vehicle accident environment. The method comprises: detecting an event associated with occurrence of a vehicle accident; obtaining environment data representative of the vehicle accident environment in which the event was detected and generating an accident information graph based on the obtained environment data, wherein the accident information graph comprises a structured representation of the obtained environment data and at least one semantic annotation to the obtained environment data.

According to another aspect of the present disclosure there is provided an emergency authority for initiating an action based on an accident information graph. The emergency authority comprises processing circuitry configured to: receive an accident information graph from a coordination node, the accident information graph comprising a structured representation of environment data from a vehicle accident environment in which an event associated with occurrence of a vehicle accident has been detected, and at least one semantic annotation to the environment data and initiate an action based on the accident information graph.

According to another aspect of the present disclosure there is provided a method, performed by an emergency authority, of initiating an action based on an accident information graph. The method comprises: receiving an accident information graph from a coordination node, the accident information graph comprising a structured representation of environment data from a vehicle accident environment in which an event associated with occurrence of a vehicle accident has been detected, and at least one semantic annotation to the environment data and initiating an action based on the accident information graph.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure relate to improving the notification of a vehicle accident to an emergency authority.

According to some examples a coordination node may coordinate generation of an accident information graph comprising information representative of a vehicle accident environment, which graph may be subsequently transmitted to an emergency authority. The accident information graph may comprise semantic annotations to environment data obtained from the vehicle accident environment. The semantic annotations may provide the emergency authority with insights that provide intuitive context to the accident environment, such that an appropriate action can be taken based on the semantic annotations.

Figure 1:
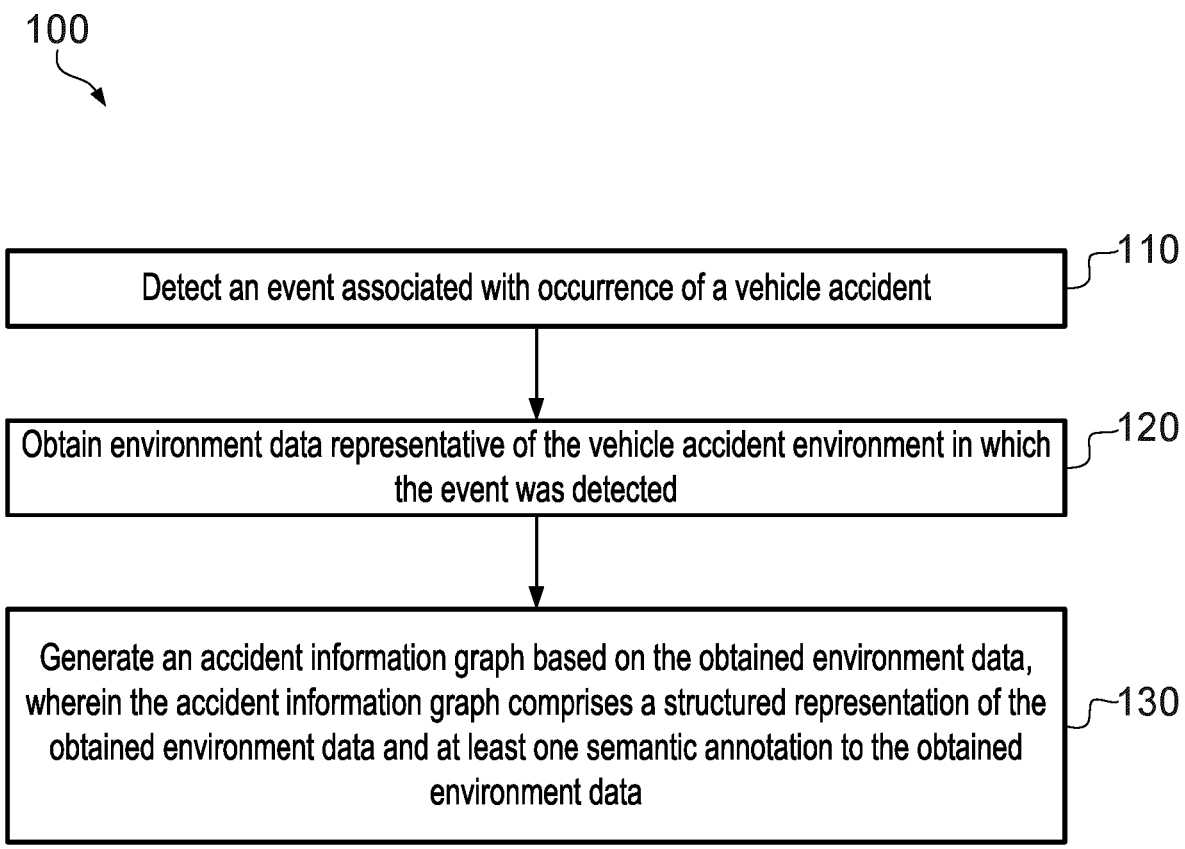
FIG. 1 is a flow chart illustrating a method performed by a coordination node.

FIG. 1 is a flow chart illustrating process steps in an example of a method 100 performed by a coordination node, for generating an accident information graph comprising information representative of a vehicle accident environment. The method comprises, in step 110, detecting an event associated with an occurrence of a vehicle accident. In some examples, the event associated with occurrence of an accident may comprise an event indicative of an imminent vehicle accident. For example, an event indicative of an imminent vehicle accident may comprise extreme deceleration, excessive braking, or a vehicle approaching a detected entity (another vehicle, a lamppost etc.) at a velocity such that there is insufficient distance between the vehicle and the entity for the vehicle to stop before colliding with the entity. In other examples, the event associated with an occurrence of a vehicle accident may comprise an event indicative that a vehicle accident has occurred. For example, an event indicative that a vehicle accident has occurred may comprise a detected collision, an abrupt forced deceleration, detected vehicle body damage, etc.

The method 100 further comprises, in step 120, obtaining environment data representative of the environment in which the event was detected. It will be appreciated that the "environment in which the event was detected" refers to the physical environment of the geographical vicinity of the event. Consequently, "environment data that is representative of the environment in which the event was detected" may encompass any data that is representative of conditions in the geographical vicinity of the detected event, physical entities present in the geographical vicinity, a condition of such entities, etc. The environment data may for example represent or describe incidents in the geographical vicinity of the detected event, which incidents may take place before, concurrently with, or after the detected event associated with a vehicle accident, and/or before, concurrently with, or after the vehicle accident itself. The environment data may comprise raw data obtained from at least one sensor, actuator or other device. The coordination node may be configured to obtain the environment data from an associated device such as a sensor, actuator etc. and/or may receive the environment data from a data gathering node.

The method 100 further comprises, in step 130, generating an accident information graph based on the obtained environment data, where the accident information graph comprises a structured representation of the obtained environment data and at least one semantic annotation to the obtained environment data. In some examples, the semantic annotation comprises a data object, such as a label, which may be applied to the environment data to provide additional meaning to the data. The semantic annotation may for example comprise metadata.

Figure 2A:
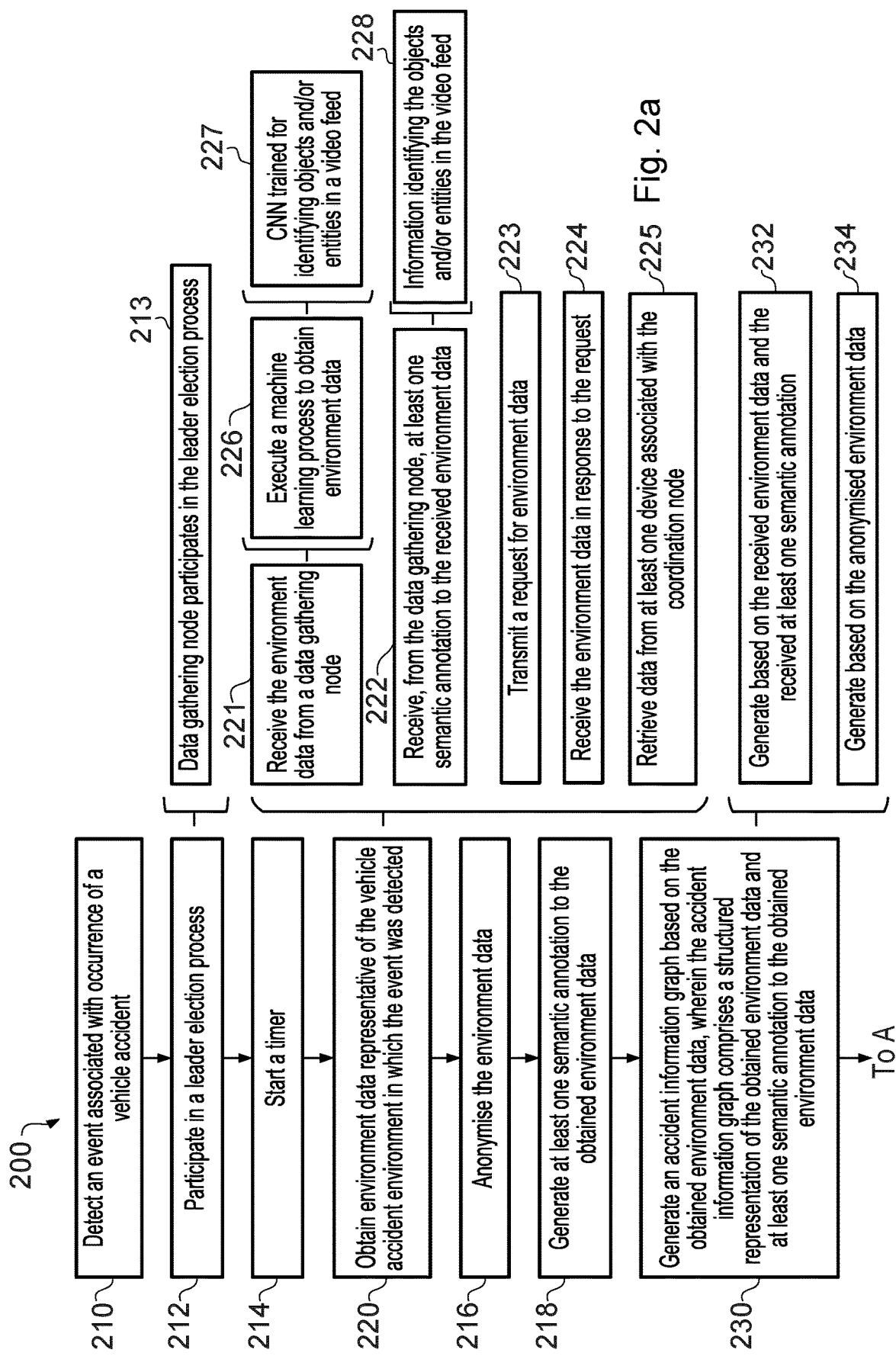
FIGS. 2a and 2b are another flow chart illustrating a method performed by a coordination node.
Figure 2B:
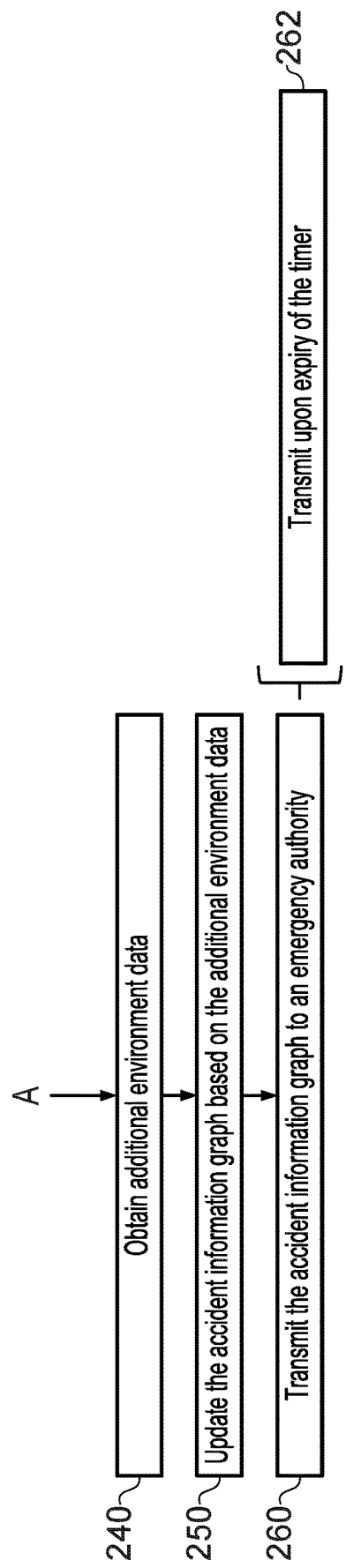

FIGS. 2a and 2b show a flow chart illustrating process steps in a further example of a method performed by a coordination node. The steps of the method 200 illustrate example ways in which the steps of the method 100 may be implemented and supplemented in order to achieve the above discussed, and additional, functionality.

Referring to FIG. 2a, method 200 comprises, in step 210, detecting by the coordination node, an event associated with an occurrence of a vehicle accident. As described above, the event may comprise an event indicative of an imminent vehicle accident or an event indicative that a vehicle accident has occurred. As will be described in more detail below, in one example, the coordination node may comprise a vehicle. In such an example, a sensor associated with the vehicle may detect the event associated with an occurrence of a vehicle accident e.g. a pressure sensor detecting a collision or an air bag sensor detecting an airbag of a vehicle being activated. In another example, the coordination node may comprise a radio access communication node such as a radio base station, eNodeB, gNodeB, etc. In such an example, the radio access communication node may detect an event associated with an occurrence of a vehicle accident through beamforming e.g. the radio access communication node may detect that a UE travelling at a speed has stopped suddenly, which may be indicative of the UE being involved in a vehicle accident.

Referring again to FIG. 2a, method 200 comprises, in step 212, participating in a leader election process. The method 200 further comprises, in step 213, a data gathering node participating in the leader election process. In one example, a plurality of entities may be operable to carry out the functionality of a coordination node in coordinating generation of an accident information graph that may be present at the site of a vehicle accident. In some examples, the plurality of entities may also be operable to carry out the functionality of a data gathering node that may be present at the site of a vehicle accident, the functionality of which will be described in more detail below. For example, at the location of the event associated with an occurrence of a vehicle accident, there may be a plurality vehicles present, each comprising processing circuitry configurable to operate as a coordination node and/or as a data gathering node. The detection of an accident detection event may thus trigger a leader election process, which in one example may be executed via a leader election algorithm. The leader election algorithm may elect an entity to act as the coordination node based on a variety of factors. For example, for vehicles participating in the leader election process, the leader election algorithm may elect a vehicle to act as the coordination node based on whether the vehicle is stationary at the location of the event associated with an occurrence of a vehicle accident. For any entity participating in the leader election process, available resources such as compute and memory resources, data communication resources etc., may also be taken into account, as well as whether the entity has suffered any damage as a consequence of the accident. Thus in some examples, the leader election algorithm may elect a leader to act as a coordination node based on the available computational capacity of the entities participating in the leader election process. In some examples, all other entities involved in the leader election process that are not elected as leader may operate as data gathering nodes, the functionality of which will be described in more detail below.

In some examples, the leader election algorithm may comprise a bully algorithm to elect a leader coordination node. In such examples, the bully algorithm assumes that all entities at the vehicle accident environment e.g. vehicles involved in vehicle accident and/or vehicles at a location able to obtain environment data from the vehicle accident environment, are able to transmit signals between each other reliably e.g. using short-range radio/sidelink, Bluetooth or other similar technology. In such examples, the bully algorithm further assumes that every entity at the vehicle accident environment is aware of its own available computational capacity (e.g. expressed in terms of floating point operations per second (FLOPS)), and further assumes that every entity may be aware of its own mobility i.e. speed and direction of travel (e.g. in km/h in a direction of a qualitative scale, e.g. North, South, East and West). The bully algorithm further assumes that every entity is aware of all other entities' available computational capacity and mobility. The bully algorithm further assumes that every entity at the vehicle accident environment may transmit and/or receive: an "election" message sent to announce a start of an election process; an "answer" or "alive" message sent as a response to the election message; and a "coordinator" or "victory" message, which may be transmitted by the winner of the bully algorithm to announce that it has been elected as the coordination node.

In some examples, based on the above assumptions, a bully algorithm may operate as follows to carry out a leader election process to elect a coordination node. An entity vk from a set of entities V may detect the occurrence of an event associated with a vehicle accident and initiate a leader election process which may comprise a bully algorithm. If entity vk has the highest available computational capacity and the lowest mobility (e.g. it is stationary) of all the entities V at the vehicle accident environment, the entity vk sends a "coordinator" or "victory" message to all other entities at the vehicle accident environment and is elected as leader to act as the coordination node. If the entity vk does not have the highest available computational capacity and the lowest mobility, the entity vk may broadcast an "election" message to all other entities at the vehicle accident environment with a higher available computational capacity and lower mobility, than the entity vk. If entity vk does not receive an "answer" message from any other entity, entity vk broadcasts a "victory" message to all other vehicles and is elected as leader to act as the coordination node. If the entity vk receives an "answer" message from an entity at the vehicle accident environment with a higher available computational capacity and lower mobility than the entity vk, the entity vk does not transmit any further messages and waits to receive a "victory" message from another of the entities. In some examples, the entity vk may start a timer and if at the end of the timer, the entity vk has not received a "victory" message, the entity vk restarts the bully algorithm process.

In another example, the entity vk receives an "election" message from another entity with a lower available computational capacity and higher mobility than the entity vk. The entity vk may transmit an "answer" message in response to the "election" message and further start an election process by broadcasting an "election" message to all other entities at a vehicle accident environment with a higher available computational capacity and lower mobility. In some examples, if the entity vk receives a "victory" message from an entity, the entity vk may treat the sender of the victory message as the coordination node.

Thus in some examples, the leader election algorithm may comprise a bully algorithm as described above. However, the skilled person will understand that a bully algorithm is one suitable example of a leader election algorithm and that other suitable leader election algorithms and processes may be used to elect a leader to act as the coordination node.

In step 214, the method 200 further comprises starting a timer. The timer may be started upon detection of the event or upon election of the coordination node as leader. The timer may be used to determine when the coordination node should send a generated accident information graph to an emergency authority. In such examples, the timer may therefore be an amount of time sufficient for the coordination node to obtain environment data and generate the accident information graph. However, the timer should not be too long because this may result in an undue delay in notifying the emergency authority of the vehicle accident. In one example, the timer may be based on the severity of the accident. For example, the environment data may be indicative of a human casualty at the vehicle accident environment. In such an example, the coordination node may therefore classify the vehicle accident environment as severe and as such the timer may be relatively short, such that an emergency authority may be notified of the accident without undue delay. In such examples the timer may therefore be about 10 seconds. In some examples, the environment data may not be indicative of a human casualty at the vehicle accident environment. In such examples, the coordination node may classify the vehicle accident environment as not severe and as such the timer may be relatively long. In such examples, the timer may be about 1 to 2 minutes. In some examples, the timer may therefore be variable based on the environment data. For example, environment data obtained from the coordination node may be indicative that the vehicle accident environment is not severe. The coordination node may therefore set a relatively long timer e.g. about 1 to 2 minutes. However, subsequent environment data received at the coordination node from a data gathering node may be indicative that the vehicle accident environment is severe e.g. environment data indicative of a human casualty. Based on such subsequent environment data, the coordination node may therefore alter the duration of the timer to a relatively short timer e.g. about 10 seconds.

Referring again to FIG. 2a, method 200 comprises, in step 220, obtaining environment data representative of the environment in which the event was detected. The coordination node may obtain the environment data, in step 221, by receiving the environment data from a data gathering node. In some examples, the coordination node may be configured to receive environment data from a plurality of data gathering nodes. As discussed in further detail below, the data may be transmitted by the data gathering nodes without prompting from the coordination node, or may be explicitly requested by the coordination node, and received in response to such a request.

The data gathering node may comprise any entity capable of obtaining environment data representative of the environment in which the event was detected. For example, the data gathering node may comprise any one of: a Radio Access node of a communication network; a communication node associated with a vehicle; a communication node associated with an item of roadside infrastructure and/or a mobile communication device e.g. user equipment (UE). The data gathering node may be associated with a sensor, and the environment data transmitted by the data gathering node may comprise sensor data retrieved from such a sensor. The data gathering node may obtain environment data, in step 226, by executing a machine learning process to obtain environment data. The machine learning process may comprise, in step 227, a convolutional neural network (CNN) trained for identifying objects and/or entities in a video feed. In one example, the data gathering node may thus use a CNN to extract environment data from video feed e.g. obtained from a camera associated with the data gathering node.

Examples of sensors that may be associated with a data gathering node comprise: sensors providing status of a vehicle to a vehicle's electronic control unit (ECU), which may include the status of airbags (inflated/not inflated), the condition of the brakes (applied or not), the ambient temperature or the condition of the driver (e.g. intoxicated, unconscious, etc.). Examples of sensors may further comprise a vehicle camera providing a video feed and/or radio images using RADAR/LIDAR, a vehicle microphone providing an audio feed and proximity sensors providing proximity readings. However, it will be appreciated that the above list is not an exhaustive list of suitable sensors and the sensor may comprise any other suitable sensor capable to obtain environment data representative of the vehicle accident environment.

In some examples, the environment data may comprise operational data. For example, the environment data may comprise data associated with a state of an entity. For example, where the coordination node and/or data gathering comprises a communication node associated with an item of roadside infrastructure the environment data may comprise data associated with a state of the item of roadside infrastructure. In one example, the item of roadside infrastructure comprises a traffic light unit and the environment data may comprise operational data associated with the traffic light unit, such as the traffic light unit displaying a red light. In the example of a data gathering node in the form of a base station, the base station may provide operational data relating to movement, behaviour or information received from one or more mobile communication devices located within the vehicle accident environment.

As discussed in further detail below, it will be appreciated that the coordination node may receive environment data from a plurality of data gathering nodes, as well as obtaining environment data from one or more devices associated with the coordination node itself. For example, if the coordination node is a vehicle, it may obtain environment data from its own sensors, actuators, operational units etc., as well as receiving such data from data gathering nodes.

In step 222, the method 200, further comprises receiving, from the data gathering node, at least one semantic annotation to the received environment data. As described above, a semantic annotation may comprise a data object, such as a label, which may be applied to the environment data to provide additional meaning to the raw data. The semantic annotation may for example comprise metadata describing the environment data. For example, to obtain environment data, the data gathering node may retrieve data from a video feed of a camera associated with a vehicle. The data gathering node may apply semantic annotations to the video feed, such as, in step 228, by identifying objects and/or entities in the video feed. For example, the data gathering node may use machine learning processing to identify objects and/or entities in a video feed. For example, the machine learning processing may comprise a convolutional neural network (CNN) trained for identifying objects and/or entities in a video feed. For example, the CNN may be trained from a suitable training dataset illustrating vehicles and similar entities that are damaged and vehicles and similar entities that are not damaged. The objects and/or entities and other data objects identified from the video feed may thus comprise semantic annotations to environment data, which may be transmitted to the coordination node.

A CNN may be trained from a dataset comprising input and output tuples. Based on the dataset, the CNN may learn that from a given input a given output is generated. For example, from a dataset of images showing damaged vehicles and vehicles without damage, for a given input image this will be associated with a given output classification e.g. "damaged vehicle" or "intact vehicle" i.e. not damaged. The CNN may thus be trained to classify an image comprising a vehicle as a "damaged vehicle" or "intact vehicle" based on the training dataset. The training dataset may further train the CNN with more detailed classifications e.g. once an image has been classified as illustrating a "damaged vehicle" further classifications may be made to identify the portion of the vehicle which has been damaged e.g. vehicle door, vehicle window, vehicle light, etc. Classifications may be further made to identify the vehicle type of vehicle e.g. the colour of the vehicle, the vehicle model, etc.

The CNN may be trained in one of two ways. In some examples, the CNN may be trained from a suitable training dataset, such as described above and hardcoded, such that the classification of the CNN is not adapted. In some examples, the CNN may be initially trained from a suitable training dataset, such as described above, and may be further retrained incrementally as new data becomes available to the CNN. For example, the CNN may classify a damaged vehicle door relatively inaccurately due to new vehicles being deployed on the road, which did not exist at the time of initial training. The CNN could thus be retrained with images obtained from one or more vehicles, such that the accuracy of the classification of the CNN improves over time for example, to recognise parts of new vehicles deployed on to the road.

Once a CNN is trained, a suitable test data set may be provided to test the accuracy of the CNN. In some examples, a subset of the training dataset e.g. about 10% of the training dataset, may be used as the test dataset. As similarly described above with reference to the training dataset, the test dataset should also be diverse, such that it provides an accurate assessment of the classification accuracy of the CNN.

Referring again to FIG. 2*a*, in step 223, the method 200 further comprises transmitting a request for environment data and, in a step 224, receiving the environment data in response to the request. The coordination node may thus be able to request one or more data gathering nodes to obtain and transmit environment data to the coordination node. The request may be transmitted via any suitable wireless communication technology, for example, the coordination node may broadcast the request, such that any data gathering node within a particular range of the coordination node may receive the request.

In a step 225, the method 200 further comprises obtaining the environment data by retrieving data from at least one device, such as a sensor, actuator etc. associated with the coordination node. A sensor may comprise any of the examples of sensors described above with reference to step 221. It will be appreciated that a sensor associated with the coordination node may comprise any suitable sensor capable of obtaining environment data representative of the vehicle accident environment. In some examples, the coordination node and the at least one device may be comprised as part of the same entity. For example, the coordination node may comprise a communications module of a vehicle and the at least one device may also be comprised as part of the vehicle.

Referring again to FIG. 2*a*, method 200 further comprises, in step 216, anonymising the environment data. In some examples, the environment data may be anonymised so as to avoid revealing the identity of individuals involved in the accident, while prioritising data for an emergency authority to carry out an action based on the accident information graph.

In some examples the environment data may be anonymised with a generalization technique. For example, the environment data may comprise a video feed of a camera illustrating a make and model of a vehicle with deformed bodywork. In such an example, the environment data may be anonymised by generalization e.g. the environment data may state "severely damaged vehicle", without specifying data that may reveal the identity of an individual associated with the particular vehicle represented.

In another example, the environment data may be anonymised with a perturbation technique. For example, where the environment data comprises a video feed, objects may be added to the video feed data to obscure data that could reveal the identity of an individual associated with a vehicle involved in the vehicle accident.

In some examples, the coordination node may be configured to anonymise all obtained environment data. For example, the coordination node may receive non-anonymised environment data from a data gathering and anonymise the received non-anonymised environment data. In another example, a data gathering node may be configured to anonymise environment data and transmit the anonymised environment data to the coordination node.

Referring again to FIG. 2*a*, in step 218, the method 200 further comprises generating at least one semantic annotation to the obtained data. For example, the obtained environment data may comprise data retrieved from a sensor. In such examples, the coordination node may thus be configured to generate a semantic annotation to the raw data. For example, the coordination node may be configured with a convolutional neural network trained to identify objects in a video feed, in a similar manner to that described above with reference to the data gathering node in step 222. It will be appreciated that the coordination node may thus receive only raw sensor data from vehicles, smart roadside objects etc., and/or may receive data plus semantic annotations/metadata. Thus logic for generating the semantic annotations (for example a CNN) may be located either in the data gathering node or the coordinating node, or in both nodes. In this manner, a data gathering node in the form of a vehicle or roadside unit with sufficient computational capability might apply audio fingerprinting and image processing to its sensor feeds before sending the data, but a more limited IoT device, for example in a smart traffic light, might send only its raw operational and/or sensor data.

In step 230, the method 200 further comprises generating an accident information graph based on the obtained environment data, where the accident information graph comprises a structured representation of the obtained environment data and at least one semantic annotation to the obtained environment data. Step 230 thus corresponds to step 130 described with reference to method 100 illustrated in FIG. 1.

Step 230 may further comprise, in step 232, generating the accident information graph based on the received environment data and the received at least one semantic annotation. The environment data and the semantic annotation may be received, as described above, with reference to step 221 and step 222, respectively. Step 230 may further comprise, in step 234, generating the accident information graph based on the anonymised environment data. The environment data may be anonymised as described above with reference to step 216.

Referring to FIG. 2*b*, the method 200 further comprises, in step 240, obtaining additional environment data and, in step 250, updating the accident information graph based on the additional environment data. For example, the coordination node may generate the accident information graph based on environment data received from at least one sensor associated with the coordination node. The coordination node may further transmit a request for additional environment data to one or more data gathering nodes and receive the additional environment data from the data gathering node or nodes, for example, as described above with reference to step 223 and 224. Upon receiving the additional environment data, the coordination node may therefore update the accident information graph with the additional environment data. This may therefore provide further information of the vehicle accident environment.

In another example, the coordination node may generate an accident information graph for example based on data retrieved from at least one sensor associated with the coordination node. The coordination node may be configured to make an additional reading from the at least one sensor associated with the coordination node, which may comprise additional environment data, which may be used to update the accident information graph. In some examples the coordination node may periodically retrieve data from at least one sensor associated with the coordination node for updating the accident information graph. In some examples the coordination node may continuously retrieve data from at least one sensor associated with the coordination node for updating the accident information graph. In other examples, a data gathering node may periodically transmit environment data (and semantic annotations) to the coordination node. In some examples, a data gathering node may continuously transmit or stream environment data (and semantic annotations) to the coordination node.

In some examples there may thus be multiple iterations of obtaining additional environment data and updating the accident information graph based on the additional environment data before transmitting the accident information graph to an emergency authority, as discussed below. The additional data may be obtained from new sources, and/or may reflect the evolution of the vehicle accident environment over time.

Referring again to FIG. 2b, in step 260, the method 200 comprises transmitting the accident information graph to an emergency authority. The emergency authority may thus be alerted to the occurrence of a vehicle accident upon receipt of the accident information graph by the coordination node, and may be able to act upon the information contained in the accident information graph. As illustrated in step 262, the method 200 may comprise transmitting the accident information graph on expiry of the timer started in step 214.

Figure 3:
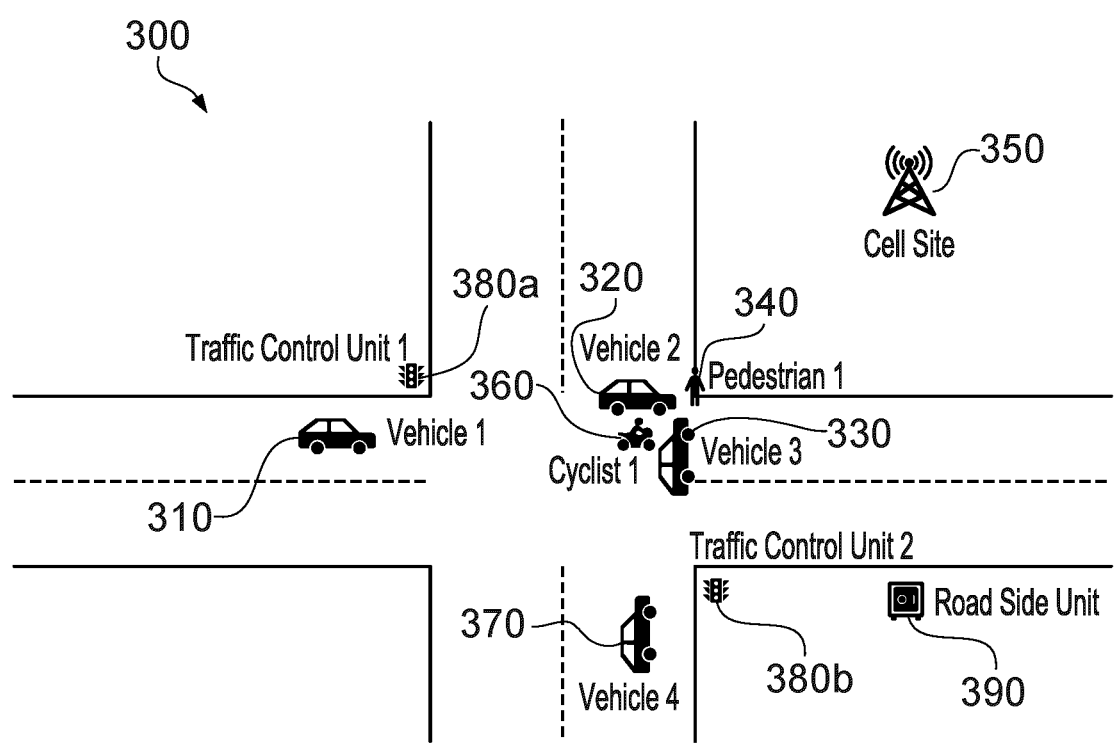
FIG. 3 is a schematic example of a vehicle accident environment.

FIG. 3 shows a schematic example of a vehicle accident environment 300 comprising at least one entity operable for carrying out the methods described above.

Referring to FIG. 3, Vehicle accident environment 300 comprises a plurality of entities 310-390. Vehicle accident environment 300 comprises first vehicle 310, second vehicle 320, third vehicle 330 and additional vehicle 370. Second vehicle 320 and third vehicle 330 may have been involved in a vehicle accident. Also involved in the vehicle accident are pedestrian 340 and cyclist 360.

Vehicle accident environment 300 further comprises first traffic control unit 380a, second traffic control unit 380b and roadside unit 390. Traffic control units 380a, 380b and roadside unit 390 are examples of roadside infrastructure. Other examples may include lampposts, road signs, pedestrian crossing points etc.

Vehicle accident environment 300 further comprises radio access node 350, illustrated in FIG. 3 as "Cell site", which is configured to provide access to a communications network. Vehicle accident environment 300 may therefore be encompassed within the geographical coverage area of the cell served by radio access node 350.

Referring again to FIG. 3, in some examples, any one of the entities 310-390 may comprise processing circuitry operable to carry out the functions of a coordination node, as described above. Furthermore, any one of the entities 310-390 may also comprise processing circuitry operable to carry out the functions of a data gathering node, as described above.

In one example, first vehicle 310 may detect an event associated with occurrence of a vehicle accident. For example, the video feed of a camera associated with first vehicle 310 may be trained by a suitable convolutional neural network and may detect that second vehicle 320, third vehicle 330, pedestrian 340 and cyclist 360 have collided resulting in a vehicle accident.

In some examples, responsive to detection of the event associated with occurrence of a vehicle accident, this may trigger a leader election process amongst the entities present at the vehicle accident environment 300 e.g. entities 310-390, where one is elected as leader to act as the coordination node. The leader election process may be carried out according to a leader election algorithm. In one example, first vehicle 310 may be elected as leader to act as the coordination node.

In such an example, first vehicle 310 may obtain environment data representative of the vehicle accident environment in which the event was detected. For example, the environment data may comprise a temperature reading from a temperature sensor associated with first vehicle 310. First vehicle 310 may further generate an accident information graph based on the obtained environment data comprising a structured representation of the obtained environment data and at least one semantic annotation to the obtained environment data. For example, the semantic annotation may comprise a label detailing the value of the temperature retrieved from a temperature sensor associated with the first vehicle 310. First vehicle 310 may further be configured to transmit the accident information graph to an emergency authority.

First vehicle 310 may also be configured to receive environment data from any of the other entities 320-390 in vehicle accident environment 300 to obtain environment data. For example, second vehicle 320 may comprise processing circuitry operable to act as a data gathering node. Second vehicle 320 may retrieve data from a sensor or other device associated with second vehicle 320 and transmit the retrieved data to the first vehicle 310, acting as the coordination node. The retrieved data may therefore comprise additional environment data received by the first vehicle 310. First vehicle 310 may therefore be configured to update the accident information graph based on the additional data.

Figure 4A:
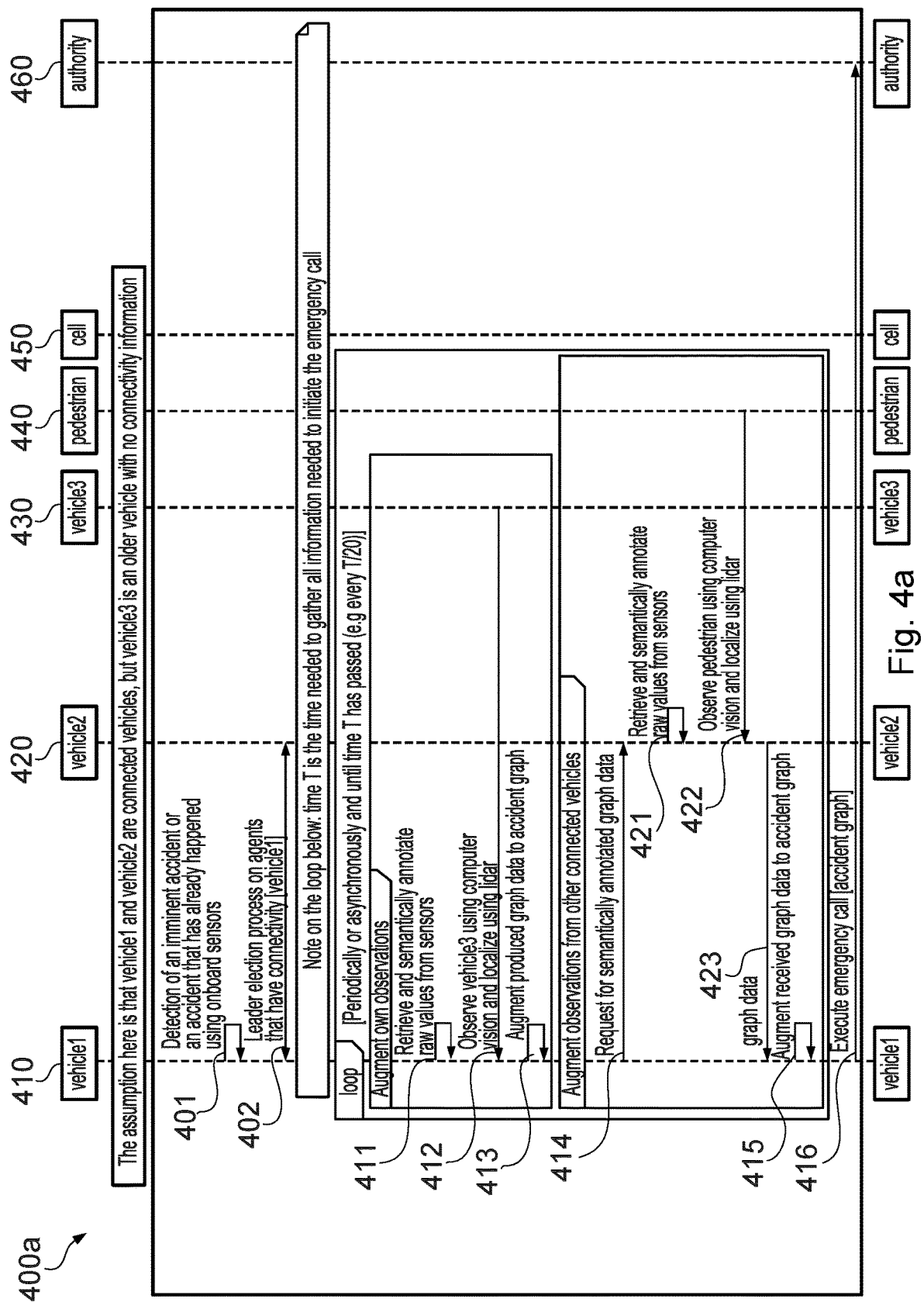
FIGS. 4a and 4b show a signalling diagram illustrating an example of communications between nodes for generating an accident information graph.

FIG. 4a shows an example signalling diagram illustrating steps taken by a first vehicle 410 comprising a coordination node operable for carrying out the methods described above with reference to FIGS. 1 and 2. FIG. 4a further illustrates the steps taken by a second vehicle 420 acting as a data gathering node for carrying out the methods described above with reference to FIGS. 1 and 2.

In step 401, first vehicle 410 may detect an event associated with occurrence of a vehicle accident. The event associated with occurrence of an accident may include an event indicative that a vehicle accident will shortly occur or has occurred. For example, from a video feed of a camera associated with the first vehicle 410, processing circuitry of the first vehicle 410 may detect that one or more vehicles have collided and are involved in a vehicle accident. The event associated with occurrence of an accident may include an event indicative of an imminent vehicle accident. For example, from a video feed of a camera associated with the first vehicle 410, processing circuitry of the first vehicle 410 may detect that a second vehicle 420 is approaching a third vehicle 430 too fast for the second vehicle 420 to stop before colliding with the third vehicle 430.

In step 402, a leader election process, which may be executed via a leader election algorithm, is started to elect a node in the vehicle accident environment to act as the coordination node. The leader election process may be started responsive to detection of the event associated with occurrence of a vehicle accident. The vehicle accident environment may comprise a plurality of entities comprising processing circuitry for carrying out the functionality of the coordination node, for example first vehicle 410 and second vehicle 420 may each comprise processing circuitry for carrying out the functionality of the coordination node. However, it will be understood that entities involved in the election process may not be limited to vehicles any may be any entity with processing circuitry for carrying out the functionality of the coordination node. For example, roadside infrastructure, a UE and a radio access node 350, may also be involved in the leader election process.

The leader election algorithm may elect the leader to act as coordination node based on a number of factors, for example, as described above, a leader may be elected to act as coordination node based on whether the vehicle is stationary at the location of the event associated with an occurrence of a vehicle accident and/or the available computational power of the vehicle. In the example illustrated in FIG. 4a, first vehicle 410 is elected as the coordination node by the vehicle election algorithm.

Referring again to FIG. 4a, in step 411, first vehicle 410 may retrieve data from a sensor associated with the first vehicle and generate a semantic annotation to the retrieved sensor data. For example audio data may be retrieved from a microphone associated with first vehicle 410 and a semantic annotation may be applied to such audio data, for example by using audio fingerprinting to identify particular sounds, such as pedestrian 440 speaking. In another example, data retrieved from an ECU associated with first vehicle 410 may be semantically annotated using an ontology such as a vehicle signal and attribute ontology for the web of things (VSSO).

In step 412, first vehicle 412 may obtain visual data of third vehicle 430. First vehicle 410 may retrieve video data from a camera associated with first vehicle 410. First vehicle may further extract data objects from the video frames of the video data by utilising a trained convolutional neural network (CNN). The data objects and the confidence level with which the data objects have been identified may be included as a semantic annotation.

In step 413, first vehicle 410 may generate an accident information graph based on the obtained environment data. The accident information graph comprises a structured representation of the obtained environment data and at least one semantic annotation to the obtained environment data. For example, the semantic annotation may describe a portion of the third vehicle 430 that has been damaged and that pedestrian 440 is speaking.

Referring again to FIG. 4a, in step 414, first vehicle 410 transmits a request for environment data to second vehicle 420. The environment data is illustrated as graph data in FIG. 4a. Second vehicle 420 may thus comprise a data gathering node, as described above. In one example, the request may be broadcast to any potential data gathering node within a range of the first vehicle 410. In another example, the request may comprise request for environment data that is unicast to the second vehicle 420.

In step 421, second vehicle 420 may retrieve data from a device such as a sensor or actuator associated with second vehicle 420 and semantically annotate the data, in a similar manner as described above in respect of first vehicle 410 in step 411. In step 422, second vehicle 420 may observe pedestrian 430, for example by using LIDAR, and such data may be included in the environment data.

Referring again to FIG. 4a, in step 423, the second vehicle 420 may transmit additional environment data to the first vehicle 410. The additional environment data may comprise the semantically annotated data retrieved from the device associated with second vehicle 420 and video data comprising visual data associated with pedestrian 440.

In step 415, first vehicle 410 may be configured to update the accident information data based on the additional environment data received from second vehicle 420. For example, the additional environment data may comprise further data associated with the second vehicle 420, which first vehicle 410 may augment into the accident information graph.

In step 416, first vehicle 410 may transmit the accident information graph to an emergency authority 460. In some examples, the transmission may comprise executing an emergency call to the emergency authority 460. In a similar manner to that described above, responsive to the detection of the event associated with occurrence of a vehicle accident, first vehicle 410 may start a timer on detection of an event associated with the vehicle accident, or on election as coordination node, and upon expiry of the timer the first vehicle 410 may transmit the accident information graph to the emergency authority 460. In some examples, first vehicle 410 may select the emergency authority 460 to transmit the accident information graph to, based on the semantic annotations of the accident information graph. For example, the semantic annotations may be indicative of a risk of fire. In such examples, first vehicle 410 may therefore transmit the accident information graph to a fire department. In some examples, the semantic annotations may further comprise a particular emergency authority associated with environment data comprised in the accident information graph. For example, the environment data may be indicative of a fire in an engine of a vehicle. A semantic annotation associated with such data may therefore specify that the associated emergency authority is a fire department and further specify the contact details of the fire department. In other examples, the emergency authority may coordinate emergency services, such that the determination as to whether to despatch fire, ambulance and/or police is made at the emergency authority.

FIG. 4a thus illustrates steps in a signalling diagram where first vehicle 410 acts as a coordination node for coordinating generation of an accident information graph. However, as described above, other entities may also be able to act as a coordination node for coordinating generation of an accident information graph.

Figure 4B:
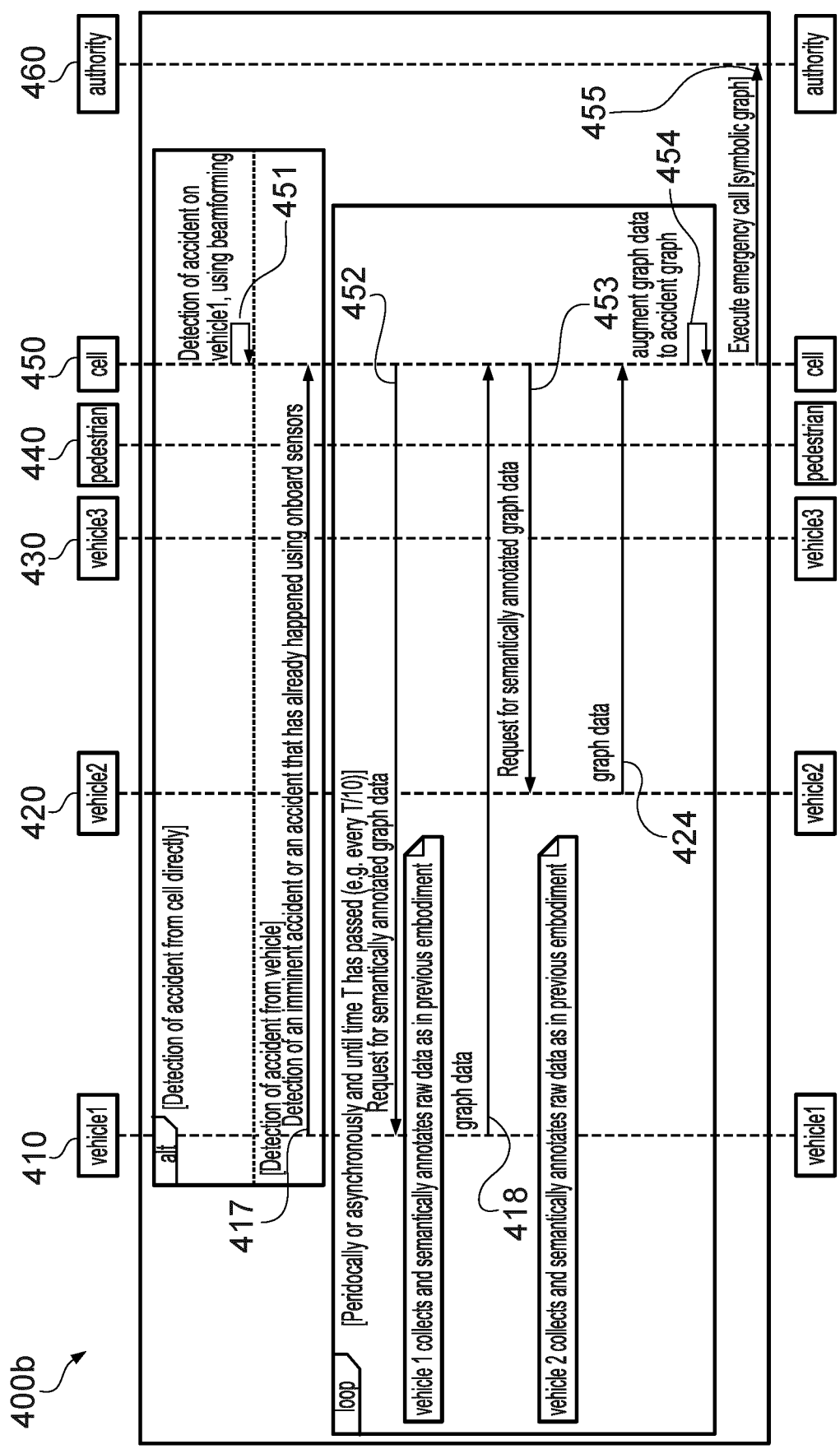

FIG. 4b shows an example signalling diagram illustrating steps taken by a radio access node 450 acting as a coordination node operable for carrying out the methods described above with reference to FIGS. 1 and 2. FIG. 4b further illustrates the steps taken by a first vehicle 410 and a second vehicle 420 acting as a data gathering nodes for carrying out the methods described above with reference to FIGS. 1 and 2.

Referring to FIG. 4*b*, in step 451, radio access node 450 may detect an event associated with occurrence of a vehicle accident. For example, the radio access node may detect that first vehicle 410 has been involved in an accident. Radio access node may use beamforming to detect that first vehicle 410, previously travelling at a given speed has come to an abrupt halt, which may be indicative that first vehicle 410 has been involved in a vehicle accident.

In step 417, vehicle 410 may also detect an event associated with occurrence of a vehicle accident and transmit notification of the detection to radio access node 450. First vehicle 410 may detect an event associated with occurrence of a vehicle accident in a similar manner as in step 401, described with reference to FIG. 4*a*. The notification transmitted by first vehicle 410 may therefore verify to radio access node 450 that first vehicle 410 has been involved in a vehicle accident.

In the illustrated example of FIG. 4*b*, detection of the event associated with occurrence of a vehicle accident does not initiate a leader election process as described above with respect to FIG. 4*a*, but rather radio access node 450 acts as the coordination node without carrying out said leader election process. However, in other examples, the detection by radio access node 450 of the event associated with occurrence of a vehicle accident may initiate a leader election process, such as that described above. A leader to act as a coordination node may be chosen from a pool of candidates including radio access node 450, first vehicle 410, second vehicle 420 or any other entity comprising processing circuitry for carrying out the functionality of the coordination node described above for coordinating generation of an accident information graph comprising information representative of a vehicle accident environment.

Referring still to FIG. 4*b*, in step 452, radio access node 450 may transmit a request to first vehicle 410 for environment data representative of the vehicle accident environment. First vehicle 410 may be configured to obtain environment data and generate at least one semantic annotation to the environment data, as described above with reference to FIG. 4*a* in steps 411-413.

In step 418, first vehicle 410 may transmit environment data to the radio access node 450. In some examples, first vehicle 410 may generate an accident information graph comprising at least one semantic annotation and transmit the generated accident information graph to radio access node 450. In another example, first vehicle 410 may transmit environment data comprising at least one semantic annotation to the radio access node 450 and the radio access node 450 may generate the accident information graph based on the environment data comprising at least one semantic annotation. In another example, the first vehicle 410 may transmit raw data to the radio access node and radio access node 450 may be configured to generate a semantic annotation to the raw data and further generate the accident information graph based on the environment data, received from the first vehicle 410 and the semantic annotation generated by the radio access node 450.

Referring still to FIG. 4*b*, in step 453, radio access node 450 may transmit a request to second vehicle 420 for additional environment data representative of the vehicle accident environment. Second vehicle 420 may be configured to obtain environment data and generate at least one semantic annotation to the environment data, as described above with reference to FIG. 4*a* in steps 421 and 412.

In step 424, second vehicle 420 may transmit additional environment data to the radio access node 450. The additional environment data may comprise raw data, semantically annotated raw data or an accident graph, in a similar manner as described above with respect to step 418, describing the transmission of environment data from the first vehicle 410 to radio access node 450.

In step 454, the radio access node may update the accident information graph based on the additional environment data received from second vehicle 420 in step 424. Radio access node 450 may update the accident information graph in a similar manner to that described above in step 415, with reference to FIG. 4*a*.

In step 455, radio access node 450 may transmit the accident information graph to an emergency authority 460. Radio access node 450 may transmit the accident information graph to the emergency authority in a manner similar to that described above in step 416, with reference to FIG. 4*a*.

Figure 5:
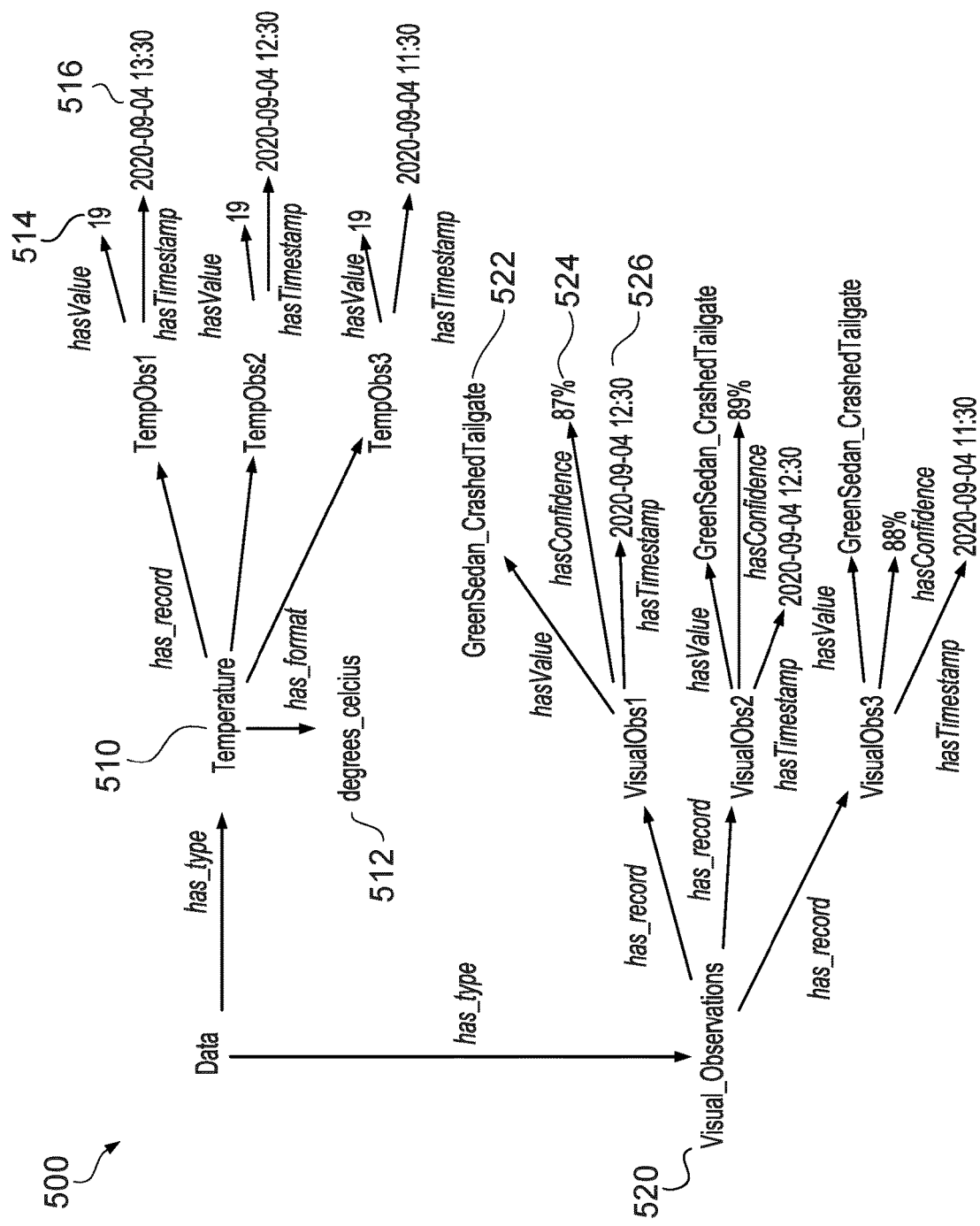
FIG. 5 is an example of an accident information graph.

FIG. 5 illustrates an example of an accident information graph 500 comprising information representative of a vehicle accident environment. The accident information graph 500 comprises a structured representation of obtained environment data representative of the vehicle accident environment. The accident information graph includes data in the form of a temperature value 514 and timestamp 516 from a temperature sensor. The accident information graph further comprises a plurality of semantic annotations. A first semantic annotation 510 comprises the label "temperature". The data 514 corresponding to the semantic annotation may be obtained from any suitable temperature sensor. A further semantic annotation specifies a unit 512, "degrees_celsius".

Accident information graph 500 further comprises a semantic annotation 520 relating to video feed data. In the illustrated example of FIG. 5, semantic annotation 520 comprises "Visual_Observations". Visual observations may be extracted from analysis of video feed data by a trained convolution neural network. The illustrated semantic annotation 520 includes multiple values specifying an extracted feature 522, such as "GreenSedan_CrachedTailgate", a confidence reading 524, e.g. 87%, and a timestamp 526.

FIG. 5 illustrates an example accident information graph 500 comprising two types of semantic annotation (temperature readings and visual observations). However, it will be appreciated that an accident information graph according to the present disclosure may comprise many more semantic annotations and data points providing a structured representation of the obtained environment data representative of the vehicle accident environment.

The semantic annotations applied to an accident information graph according to the present disclosure may therefore provide contextual meaning to the data present in the accident information graph. However, a generated accident information graph may be further augmented to provide increased contextual information and meaning by generating and applying interpretations to the accident information graph.

Figure 6:
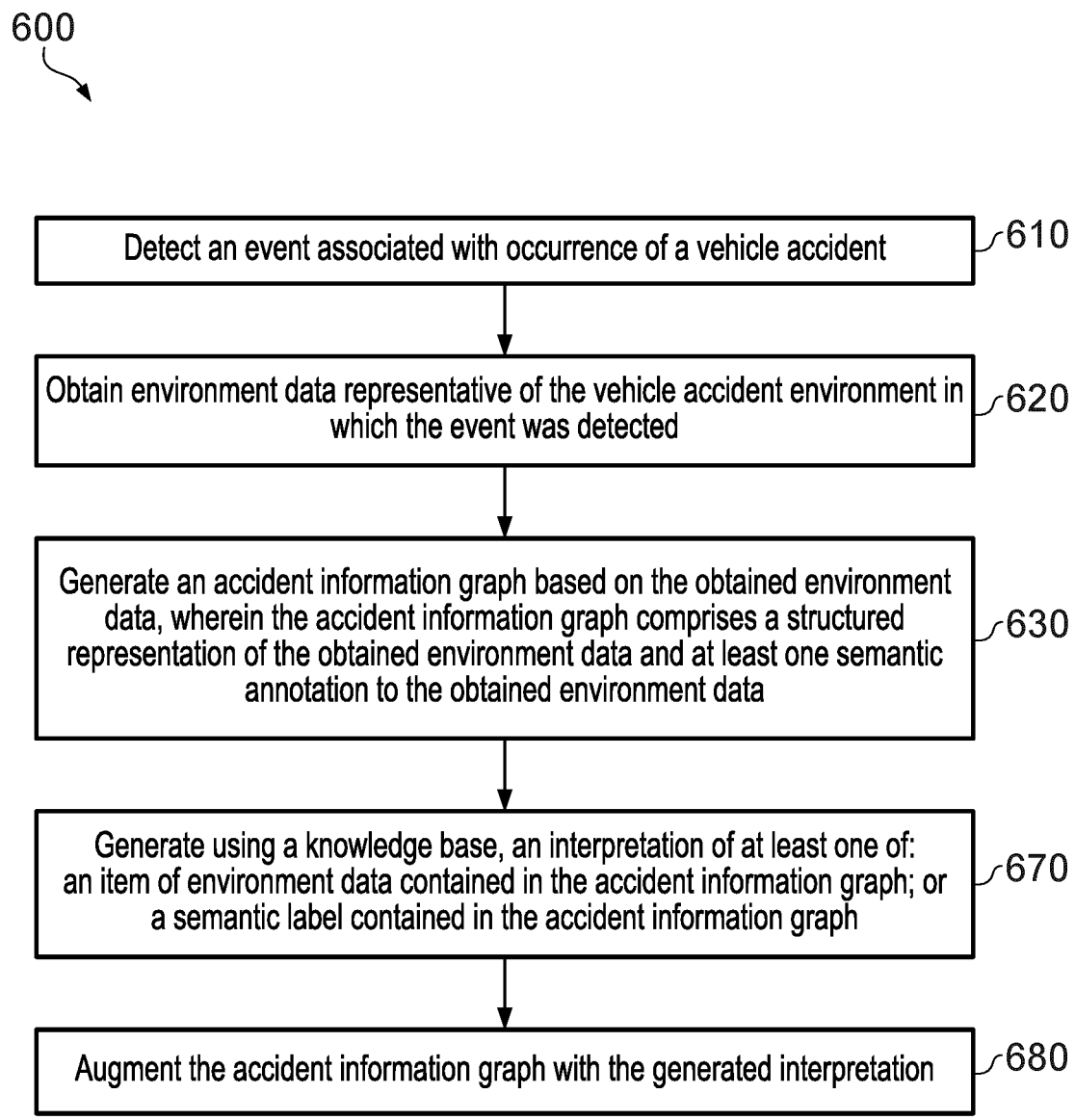
FIG. 6 is another flow chart illustrating a method performed by a coordination node.

FIG. 6 is a flow chart illustrating process steps in an example of a method 600 performed by a coordination node, for coordinating generation of an accident information graph. The steps of the method 600 illustrate example ways in which the steps of the method 100 and method 200 may be implemented and supplemented in order to achieve the above discussed and additional functionality.

Referring to FIG. 6, method 600 comprises steps 610, 620, 630, which may correspond to the steps 110, 120, 130 and steps 210, 220, 230, described above in method 100 and method 200, respectively.

Method 600 further comprises, in step 670, generating, using a knowledge base, an interpretation of at least one of: an item of environment data contained in the accident information graph or a semantic label contained in the accident information graph. In some examples, the knowledge base may be stored in a memory associated with the coordination node. In other examples, the knowledge base may be requested from a third party such as a manufacturer of a vehicle involved in the vehicle accident or a transportation authority. In such examples, the knowledge base may thus be maintained in a server accessible by the coordination node, for example in cloud storage.

The knowledge base may enable the coordination node to generate an interpretation of the data comprised in the accident information graph, to provide further contextual meaning for the data in the accident information graph. For example, the data in the accident information graph may comprise a temperature reading taken from an engine of a vehicle. A knowledge base may be obtained, in one example, from the manufacturer of the vehicle. The knowledge base may comprise a ranges of temperature values, where each one of the ranges is associated with a probability of a fire occurring based on the range of temperature. For example, the knowledge base may specify that for an engine temperature of 0-40° C., this corresponds to a low probability of fire. Thus for an engine temperature reading of 19° C., as illustrated in the accident information graph of FIG. 5, based on the knowledge base described above, an interpretation may be generated describing that there is a low probability of fire based on the engine temperature reading of 19° C.

Referring again to FIG. 6, method 600 further comprises, in step 680, augmenting the accident information graph with the generated interpretation. Augmenting the accident graph may comprise annotating the accident information graph with the interpretation or appending the interpretation to the accident information graph.

The augmented accident information graph comprising at least one interpretation may thus provide insights to an emergency authority of the information of a vehicle accident environment, which may not be obtainable from the data and semantic annotations of the accident information graph alone e.g. by providing vehicle manufacture-specific insights.

Figure 7:
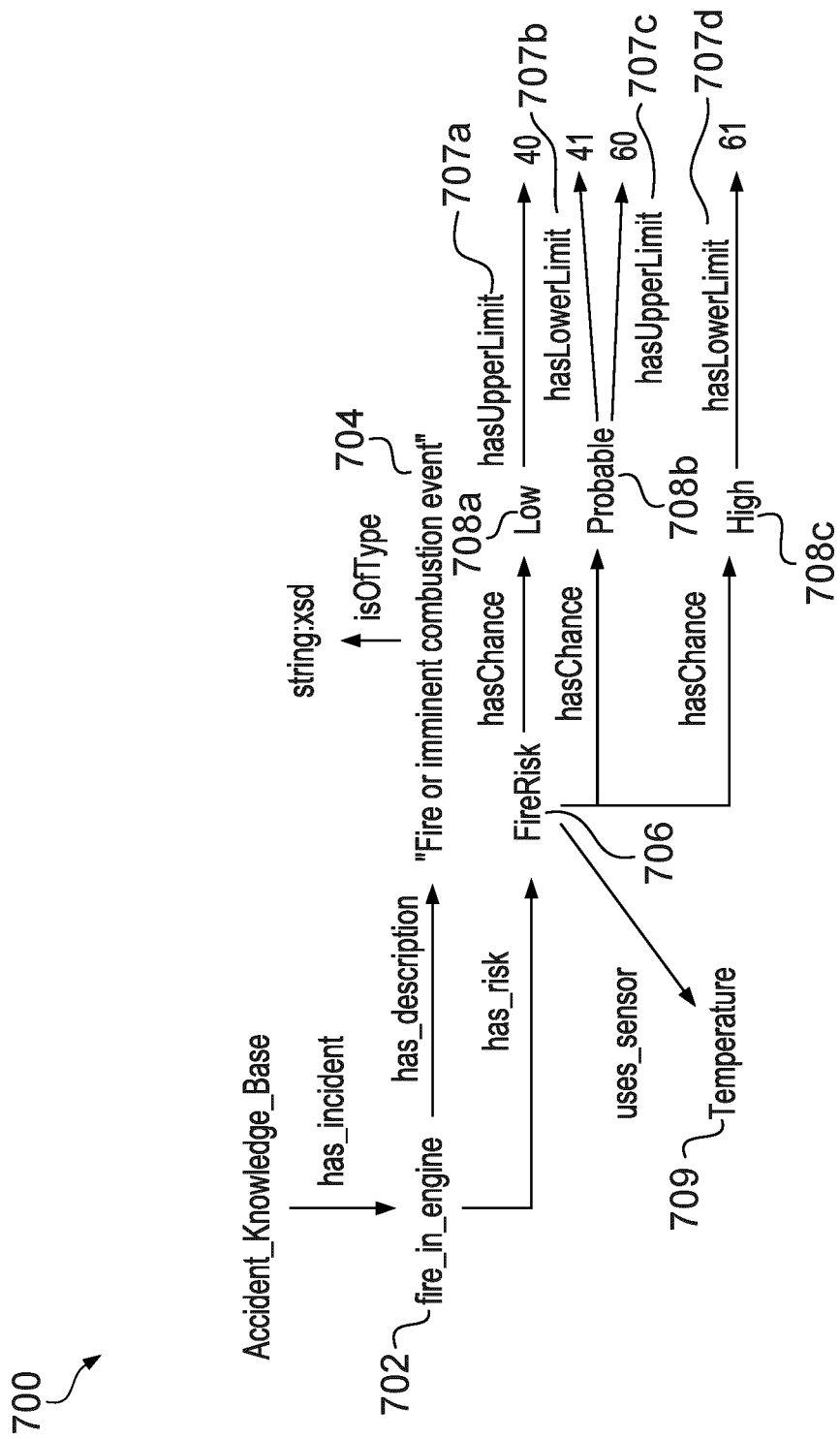
FIG. 7 is an example of a knowledge base.

FIG. 7 shows an example knowledge base 700, which may be used by a coordination node according to the present disclosure to generate an interpretation as described above with reference to method 600.

Referring to FIG. 7, knowledge base 700 may comprise a plurality of potential incidents, including for example incident 702, "fire_in_engine". Each incident, including incident 702 may be associated with a description, such as description 704, which may comprise a text label for expressing or annotating the accident graph with a corresponding interpretation. In the illustrated example of FIG. 7, the description 704 comprises the text "Fire or imminent combustion event".

Example knowledge base 700 further comprises a risk tree 706, associated with the incident 702, which illustrates a plurality of likelihoods 708a-708c, which may be associated with the incident 702, e.g. the likelihood of a fire at the vehicle accident environment. The risk tree specifies the data source 708 that may be used to assess likelihood of the indecent, in the illustrated example the data source is temperature, which may comprise data taken from a temperature sensor associated with a vehicle involved in the vehicle accident. The value of such a data reading may therefore determine a likelihood of the incident 702. The risk tree further comprises a plurality of ranges for the data source associated with the plurality of likelihoods 708a-708c. For example, referring again to FIG. 7, for a temperature reading with a value less than 40, this may correspond to a Low likelihood 708a of a fire being present at the vehicle environment. A temperature reading of between 41 and 60 may correspond to a Probable likelihood 708b of a fire being present at the vehicle environment. A temperature reading of greater than 61 may correspond to a High likelihood 708c of a fire being present at the vehicle environment.

It will be appreciated that knowledge base 700 is an example of a knowledge base illustrating only a single example incident. A knowledge base may comprise many more incidents and corresponding descriptions, risk trees and other vectors that may be used for generating an interpretation of an accident information graph according to the present disclosure.

Figure 8:
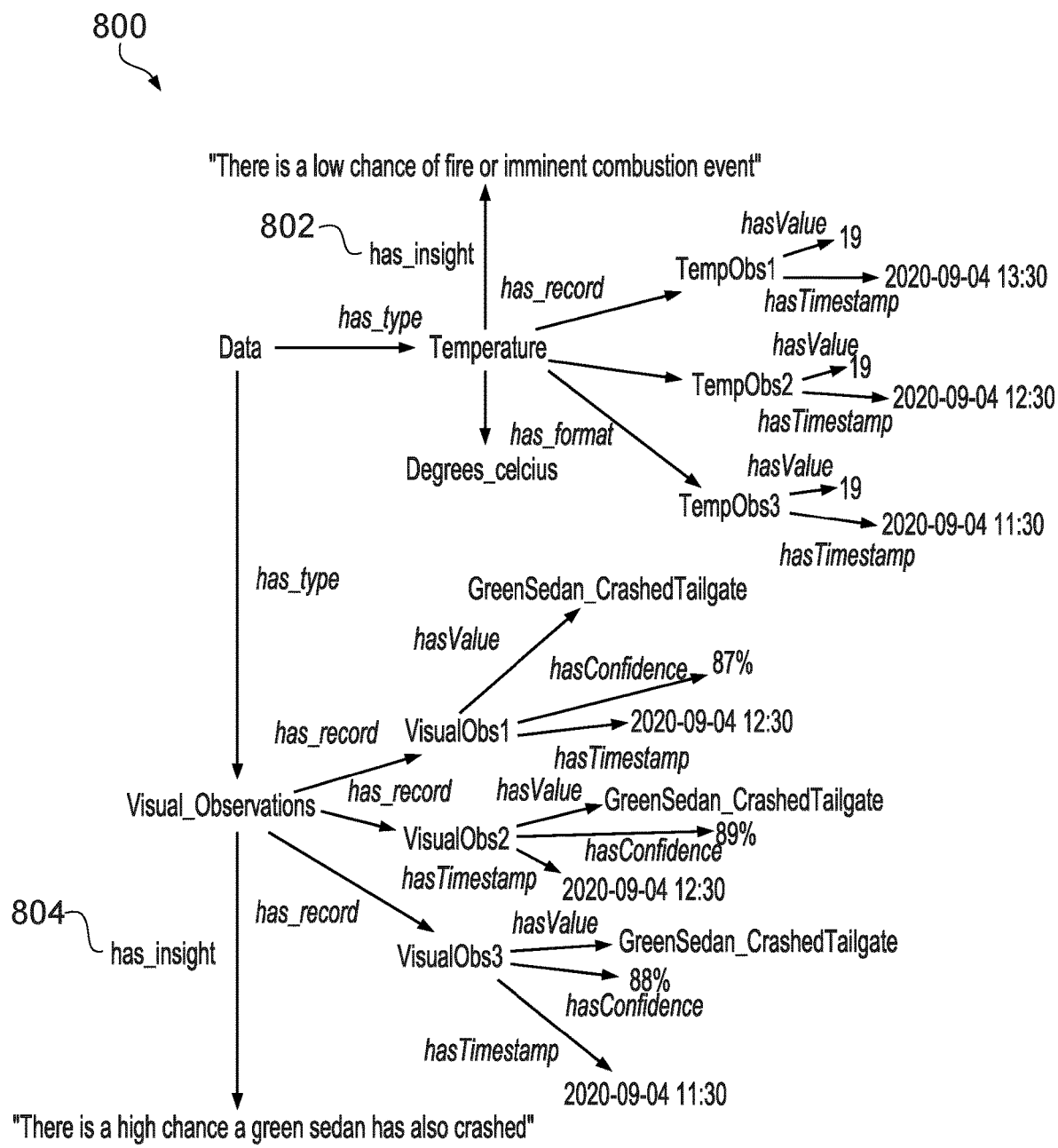
FIG. 8 is another example of an accident information graph.

FIG. 8 illustrates an example of an augmented accident information graph 800 comprising a first interpretation, labelled in FIG. 8 as a first insight 802, and a second interpretation, labelled in FIG. 8 as second insight 804. First insight 802 and second insight 804 may have been generated by a coordination node based on a knowledge base. First insight 802 and second insight 804, may each comprise an interpretation of environment data comprised in the augmented accident information graph 800.

Referring again to FIG. 8, first insight 802 comprises an annotation that "There is a low chance of fire or imminent combustion event". For example, as described above with reference to FIG. 7, based on one or more temperature readings e.g. of 19° C., this may be associated with a low likelihood of a fire of combustion event in a knowledge base.

Referring again to FIG. 8, second insight 804 comprises an annotation that "There is a high chance a green sedan has also crashed". For example, based on a knowledge base, the second insight 804 may be based on one or more confidence readings e.g. 87% confidence, of a true visual observation specifying a crashed tailgate. For example a confidence reading of greater than 80% associated with a visual observation referencing a crashed vehicle body component may be associated with a high likelihood that the relevant vehicle has crashed.

First insight 802 and second insight 804 are thus examples of interpretation of the environment data comprised in accident information graph 800, which may provide further contextual meaning to the environment data present in accident information graph 800.

Figure 9:
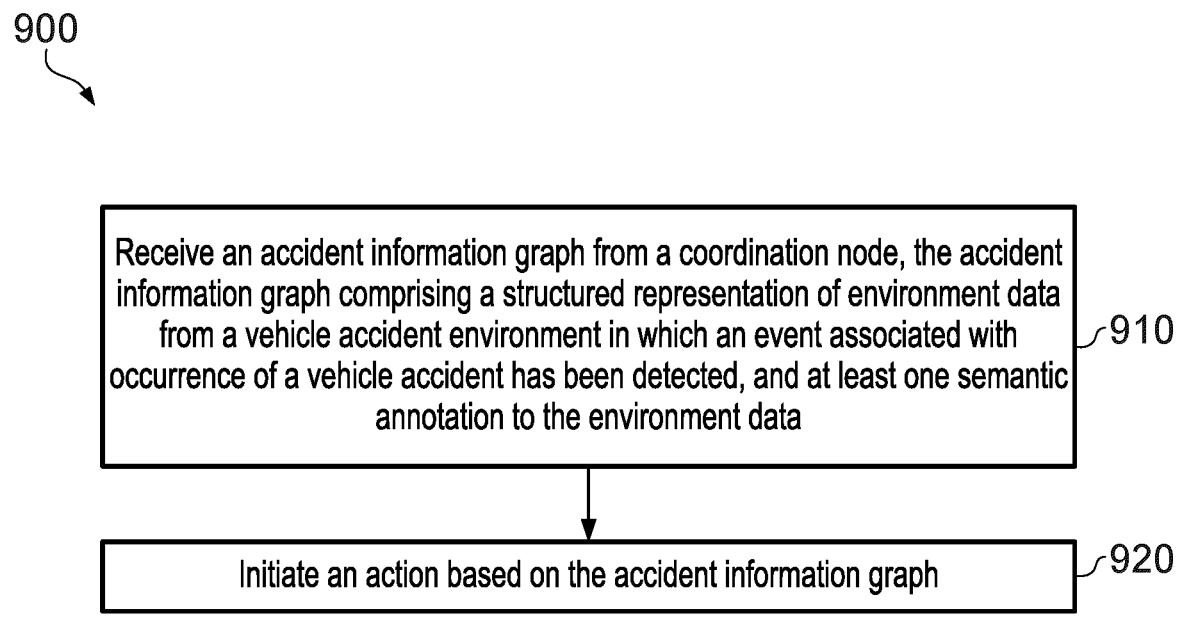
FIG. 9 is a flow chart illustrating a method performed by emergency authority.

FIG. 9 is a flow chart illustrating process steps in an example of a method 900 performed by an emergency authority, of initiating an action based on an accident information graph. The method comprises, in step 910, receiving an accident information graph from a coordination node, the accident information graph comprising a structured representation of environment data from a vehicle accident environment in which an event associated with occurrence of a vehicle accident has been detected, and at least one semantic annotation to the environment data. The method further comprises, in step 920, initiating an action based on the accident information graph. For example, the action may comprise alerting an emergency service based on the accident information graph. In one example, the accident information graph may comprise an indication of a high risk of fire occurring at the vehicle accident environment. In such an example, the action may comprise notifying a fire department of a location and severity of the vehicle accident environment.

Figure 10:
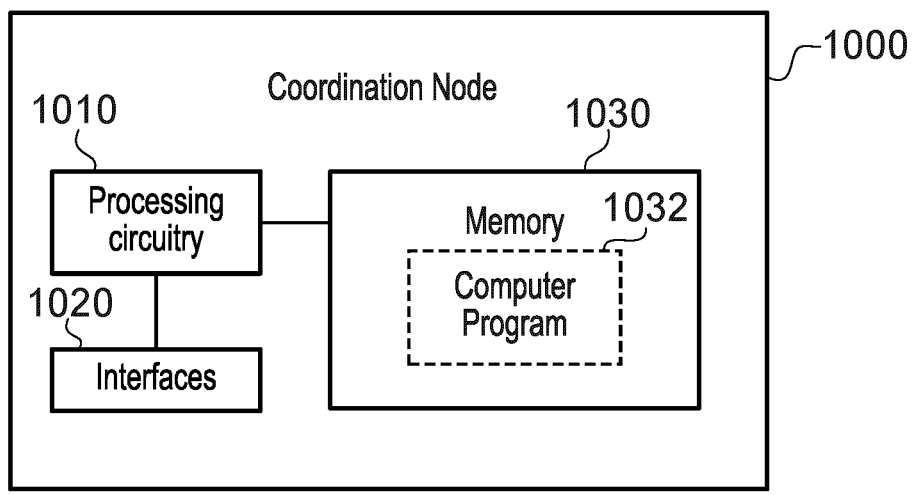
FIG. 10 is an example of a coordination node.

FIG. 10 is a block diagram illustrating an example coordination node 1000 which may be operable to implement the method 100 and/or 200 and/or 600 according to examples of the present disclosure, for example on receipt of suitable instructions from a computer program 1032. Referring to FIG. 10, the coordination node 1000 comprises a processor or processing circuitry 1010, and may comprise a memory 1030 and interfaces 1020. The processing circuitry 1010 is operable to perform some or all of the steps of the method 100 and/or 200 and/or 600 as discussed above with reference to FIGS. 1, 2, and 6. The memory 1030 may contain instructions executable by the processing circuitry 1010 such that the coordination node 1000 is operable to perform some or all of the steps of the method 100 and/or 200 and/or 600. The instructions may also include instructions for executing one or more telecommunications and/or data communications protocols. The instructions may be stored in the form of the computer program 1032. In some examples, the processor or processing circuitry 1010 may include one or more microprocessors or microcontrollers, as well as other digital hardware, which may include digital signal processors (DSPs), special-purpose digital logic, etc. The processor or processing circuitry 1010 may be implemented by any type of integrated circuit, such as an Application Specific Integrated Circuit (ASIC), Field Programmable Gate Array (FPGA) etc. The memory 1032 may include one or several types of memory suitable for the processor, such as read-only memory (ROM), random-access memory, cache memory, flash memory devices, optical storage devices, solid state disk, hard disk drive etc.

Figure 11:
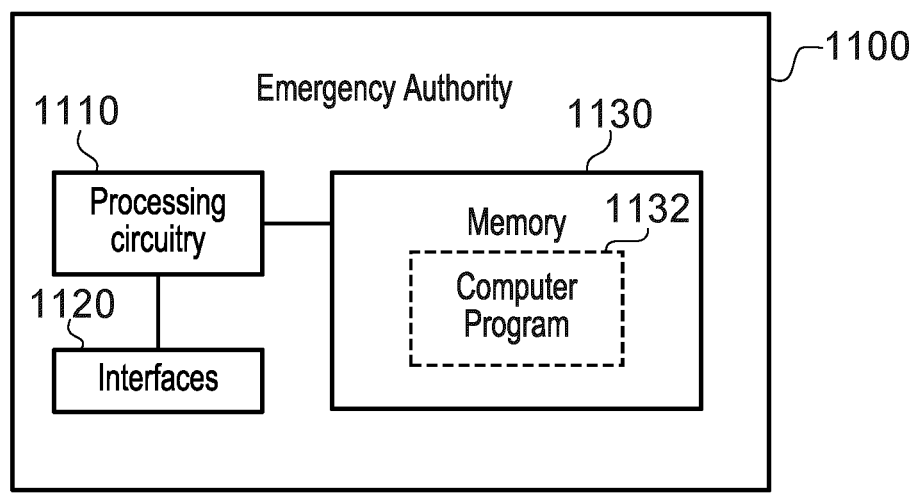
FIG. 11 is an example of an emergency authority.

FIG. 11 is a block diagram illustrating an example emergency authority 1100 which may be operable to implement the method 900 according to examples of the present disclosure, for example on receipt of suitable instructions from a computer program 1132. Referring to FIG. 11, the emergency authority 1100 comprises a processor or processing circuitry 1110, and may comprise a memory 1130 and interfaces 1120. The processing circuitry 1110 is operable to perform some or all of the steps of the method 900 as discussed above with reference to FIG. 9. The memory 1130 may contain instructions executable by the processing circuitry 1110 such that the emergency authority 1100 is operable to perform some or all of the steps of the method 900. The instructions may also include instructions for executing one or more telecommunications and/or data communications protocols. The instructions may be stored in the form of the computer program 1132. In some examples, the processor or processing circuitry 1110 may include one or more microprocessors or microcontrollers, as well as other digital hardware, which may include digital signal processors (DSPs), special-purpose digital logic, etc. The processor or processing circuitry 1110 may be implemented by any type of integrated circuit, such as an Application Specific Integrated Circuit (ASIC), Field Programmable Gate Array (FPGA) etc. The memory 1132 may include one or several types of memory suitable for the processor, such as read-only memory (ROM), random-access memory, cache memory, flash memory devices, optical storage devices, solid state disk, hard disk drive etc.

Examples of the present disclosure thus provide a coordination node for coordinating generation of an accident information graph comprising information representative of a vehicle accident environment. The accident information graph comprises a structured representation of the obtained environment data and at least one semantic annotation to the obtained environment data, which may be transmitted to an emergency authority to notify the emergency authority of a vehicle accident. The semantic annotation may provide contextual meaning to the information comprised in the accident information graph, which may provide an emergency authority with a more intuitive assessment of the information comprised in the accident information graph compared to raw data e.g. from sensors.

Examples of the present disclosure also provide a coordination node able to generate an accident information graph including information of vehicles or other entities that are not themselves equipped with IoT communication technology. For example an IoT equipped vehicle may obtain data associated with a legacy vehicle, which may further form part of the accident information graph. In a similar manner, the accident graph may further comprise information of vehicles that have become so severely damaged that they cannot transmit accurate data to an emergency authority. For example, an entity nearby the vehicle accident, but not involved in the vehicle accident may obtain environment data of the vehicle accident environment, which may further be comprised in the accident information graph. An accident information graph according to the present disclosure thus provides improved accuracy of the information representative of a vehicle accident environment. This may enable the accident graph to be used to provide evidence for accountability or liability of individual entities relating to the cause of a vehicle accident, and even to record vehicle accidents where it may be difficult to identify those causing the accident, such as in "hit and run" or similar accidents.

Examples of the present disclosure also provide a coordination node able to augment an accident information graph with interpretations of the information contained therein, such interpretations generated using a knowledge base. The interpretations may provide further insights relating to the information comprised in the accident information graph, including for example vehicle manufacturer specific insights or interpretations. A coordination graph according to the present disclosure may also be configured to anonymise data present in the accident information graph to preserve the privacy of those involved in the accident.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:
1. An apparatus comprising:
one or more communication interfaces; and
processing circuitry operatively associated with the one or more communication interfaces and configured to:

exchange signaling with one or more other apparatuses that are within a geographical vicinity of a detected event that is associated with occurrence of a vehicle accident, including:

carrying out an election process whereby the apparatus is elected as a coordinating node and the one or more other apparatuses serve as data gathering nodes with respect to a vehicle accident environment in which the event was detected; and acting as the coordinating node, based on receiving environment data from the data gathering nodes, the environment data representative of the vehicle accident environment and including sensor data obtained from sensors in the data gathering nodes generate an accident information graph as a structured representation of the received environment data, including processing the received environment data and adding semantic annotations based on results of the processing; and transmit the accident information graph to an emergency authority.

2. A method performed by an apparatus, the method comprising:

exchanging signaling with one or more other apparatuses that are within a geographical vicinity of a detected event that is associated with occurrence of a vehicle accident, including:

carrying out a leader election process whereby the apparatus is elected as a coordinating node and the one or more other apparatuses serve as data gathering nodes with respect to a vehicle accident environment in which the event was detected; and acting as the coordinating node, based on receiving environment data from the data gathering nodes, the environment data representative of the vehicle accident environment and including sensor data from sensors in the data gathering nodes;

generating an accident information graph as a structured representation the received environment data, including processing the received environment data and adding semantic annotations based on results of the processing; and transmitting the accident information graph to an emergency authority.

3. The method according to claim 2, further comprising:
starting a timer upon in association with the event detection; and
transmitting the accident information graph upon expiry of the timer.

4. The method according to claim 3, further comprising setting a duration of the timer according to an estimated severity of the vehicle accident.

5. The method according to claim 4, wherein acting as the coordinating node based on receiving the environment data comprises using the duration of the timer as a window for gathering environment data from the data gathering nodes, and wherein generating the accident information graph comprises basing the accident information graph on all environment data gathered during the window.

6. The method according to claim 2, wherein the environment data includes video data from one or more of the data gathering nodes, and wherein generating the accident information graph includes performing object recognition on the video data via a convolutional neural network trained for identifying objects or entities, and wherein adding the semantic annotations includes adding object labels for objects recognized in the video data.

7. The method according to claim 2, wherein carrying out the leader election process comprises the apparatus exchanging information with the one or more other apparatuses, each respective apparatus involved in the exchange indicating one or more factors bearing on suitability of the respective apparatus for leader election, the one or more factors including at least one of: available computational capacity of the respective apparatus, and whether the respective apparatus is moving.

8. The method according to claim 7, further comprising the apparatus initiating the leader election process based on detecting the event.

9. The method according to claim 4, wherein the one or more other apparatuses comprise any ones or any mix of:
a Radio Access node of a communication network;
a communication node associated with a vehicle; and
a communication node associated with an item of roadside infrastructure.

10. The method according to claim 2, further comprising transmitting requests for the environment data and receiving the environment data responsive to the requests.

11. The method according to claim 2, further comprising:
anonymising the environment data; and
generating the accident information graph based on the anonymised environment data.

12. The method according to claim 2, wherein the apparatus acting as the coordination node comprises one of:
a Radio Access node of a communication network;
a communication node associated with a vehicle;
a communication node associated with an item of roadside infrastructure.

* * * * *